(12) United States Patent
Weigand et al.

(10) Patent No.: US 9,732,905 B2
(45) Date of Patent: Aug. 15, 2017

(54) LUBRICATING PUMP AND METHOD FOR SUPPLYING LUBRICANT

(75) Inventors: Michael Weigand, Geldersheim (DE); Peter Koch, Geldersheim (DE)

(73) Assignee: TriboServ GmbH & Co. KG, Geldersheim (DE)

( * ) Notice: Subject to any disclaimer, the term of this patent is extended or adjusted under 35 U.S.C. 154(b) by 1328 days.

(21) Appl. No.: 13/500,554

(22) PCT Filed: Oct. 12, 2010

(86) PCT No.: PCT/DE2010/001207
§ 371 (c)(1),
(2), (4) Date: Apr. 5, 2012

(87) PCT Pub. No.: WO2011/044888
PCT Pub. Date: Apr. 21, 2011

(65) Prior Publication Data
US 2012/0207633 A1 Aug. 16, 2012

(30) Foreign Application Priority Data
Oct. 12, 2009 (DE) ........................ 20 2009 013 851

(51) Int. Cl.
*F16N 13/02* (2006.01)
*F04B 25/00* (2006.01)
*F15B 15/06* (2006.01)
*F04B 9/02* (2006.01)
*F04B 23/10* (2006.01)

(52) U.S. Cl.
CPC ................ *F16N 13/02* (2013.01); *F04B 9/02* (2013.01); *F04B 23/10* (2013.01); *F04B 25/005* (2013.01); *F15B 15/065* (2013.01); *F16N 2210/33* (2013.01)

(58) Field of Classification Search
CPC ........ F16N 13/02; F04B 23/10; F04B 25/005; F04B 15/06; F04B 9/047; F04B 9/02; F15B 15/065
USPC ........ 417/489, 532, 366, 437; 277/908–910; 92/136
See application file for complete search history.

(56) References Cited

U.S. PATENT DOCUMENTS 235,547 A * 12/1880 Mathews .................. F04B 9/02
417/529
1,562,664 A * 11/1925 Tedrick ........................ 184/27.2
1,951,503 A * 3/1934 Creveling ..................... 141/347
(Continued)

FOREIGN PATENT DOCUMENTS

CA 920518 A1 2/1973
DE 632525 C 7/1936
(Continued)

*Primary Examiner* — Devon Kramer
*Assistant Examiner* — Lilya Pekarskaya
(74) *Attorney, Agent, or Firm* — Levine Mandelbaum PLLC

(57) ABSTRACT

The invention relates to a lubricating pump which contains screw pistons of which one is in compression operation and the other is in suction operation in alternation. The invention further relates to a method for supplying lubricant, wherein a first screw piston is in a suction operation while a second screw piston is in a compression operation and vice versa, and wherein the two screw pistons are driven by means of a common gear train, which contains one piston gear for each screw piston.

14 Claims, 9 Drawing Sheets

(56) References Cited

U.S. PATENT DOCUMENTS

| | | | |
|---|---|---|---|
| 2,312,304 A | | 3/1943 | Anderson |
| 3,291,350 A | * | 12/1966 | Malec ..................... F16N 3/12 |
| | | | 222/318 |
| 3,682,273 A | * | 8/1972 | Allard et al. ................ 184/27.2 |
| 4,017,223 A | * | 4/1977 | Blackwell ..................... 418/107 |
| 4,089,624 A | * | 5/1978 | Nichols ................ B01L 3/0206 |
| | | | 417/362 |
| 4,631,009 A | * | 12/1986 | Cygnor et al. .................. 418/15 |
| 4,648,363 A | * | 3/1987 | Kronich ................... 123/196 R |
| 5,144,882 A | * | 9/1992 | Weissgerber ......... F04B 53/164 |
| | | | 277/550 |
| 5,799,690 A | * | 9/1998 | Jacobsen ............... A61M 5/142 |
| | | | 137/533.11 |
| 6,406,281 B1 | * | 6/2002 | Aggradi et al. ................ 418/88 |
| 8,453,530 B2 | * | 6/2013 | Duits et al. .................. 74/89.23 |
| 2003/0037995 A1 | * | 2/2003 | Patterson et al. ........... 184/105.1 |
| 2005/0019187 A1 | * | 1/2005 | Whitworth ........... F04B 7/0007 |
| | | | 417/532 |
| 2010/0139453 A1 | * | 6/2010 | Chu .................... B65H 3/0669 |
| | | | 74/664 |

FOREIGN PATENT DOCUMENTS

| | | |
|---|---|---|
| DE | 102006026274.3 A2 | 12/2007 |
| FR | 860370 A | 1/1941 |

\* cited by examiner

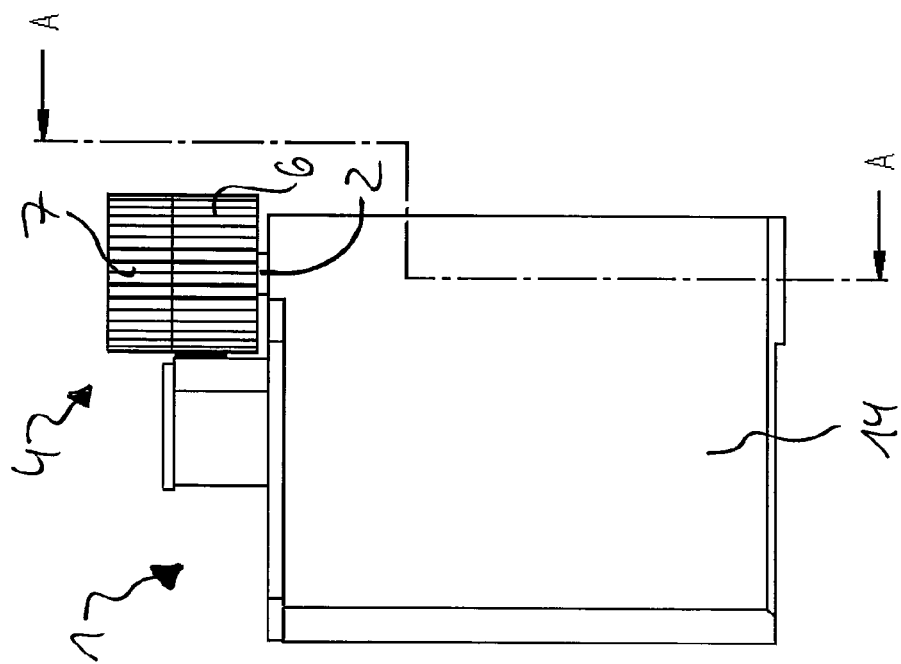
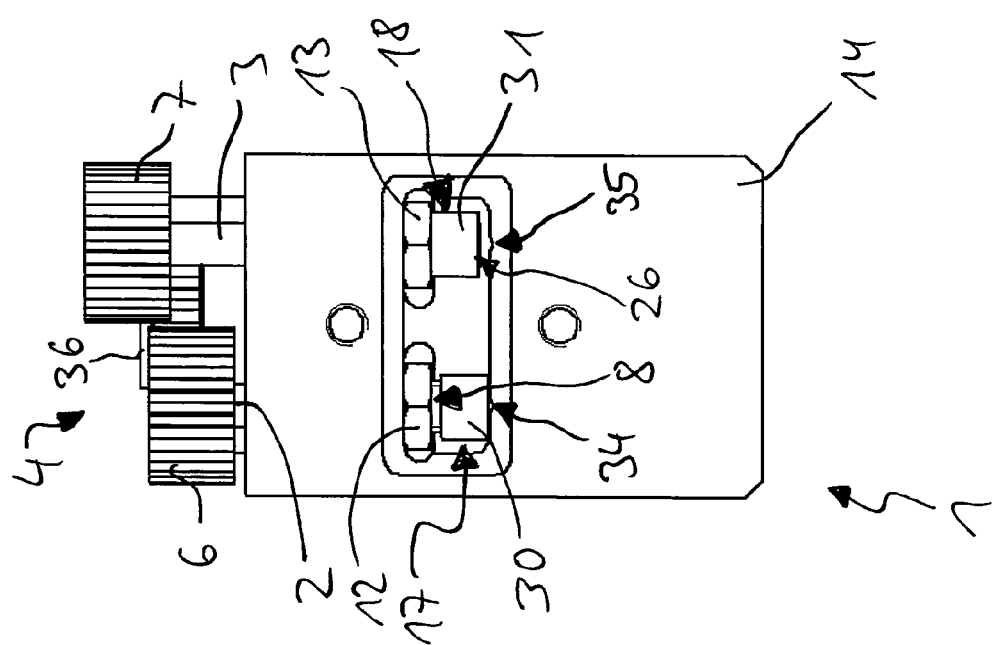
Fig. 5a
Fig. 5b

LUBRICATING PUMP AND METHOD FOR SUPPLYING LUBRICANT

BACKGROUND OF THE INVENTION

The invention relates to a lubricating pump as per the preamble of claim 1 and to a method for supplying lubricant.

Lubricating devices such as for chains and gearwheels, for example, require a lubricant supply, which may be realized inter alia through the use of a lubricating pump.

DE 102006026274 discloses an automatic lubricating pump which is designed such that it can be connected to a pressure line of a hydraulic circuit, with repeatedly rising or constant hydraulic pressure, of a machine such as a construction machine with a hydraulic hammer, said lubricating pump having a drive piston designed such that it can be driven by the hydraulic circuit and having a delivery piston which is connected in movement-transmitting fashion to the drive piston and which adjoins a delivery chamber which can be filled with lubricant and which is connected to at least one lubricant outlet of the automatic lubricating pump, wherein the drive piston is of double-acting design with two drive chambers, and wherein a switching element which is connected into the hydraulic circuit and which can be actuated by the hydraulic pressure is provided, by means of which switching element, during operation, the working chambers can be connected alternately to the pressure line.

Lubricating pumps of this type or other lubricating pumps known from practice are very complex and/or of large construction, all of which opposes the use thereof as an auxiliary means.

SUMMARY OF THE INVENTION

It is the aim of the invention to permit simple, cheap and space-saving lubrication.

Said aim is achieved according to the invention by means of a lubricating pump according to claim 1.

According thereto, the present invention provides a lubricating pump which comprises two screw-type pistons, of which alternately one is in pressure operation and the other is in suction operation.

Said lubricating pump preferably comprises a gearing for driving both screw-type pistons simultaneously such that alternately one is in pressure operation and the other is in suction operation. Here, the gearing comprises a drive pinion with which meshes a first piston gearwheel which is assigned to the first screw-type piston and which in turn meshes with a second piston gearwheel which is assigned to the second screw-type piston, such that the two screw-type pistons, with screw threads in identical senses, automatically always rotate in opposite directions and preferably at identical speeds, such that alternately one screw-type piston is in pressure operation and the other screw-type piston is in suction operation. It is furthermore preferable here for each piston to comprise a screw spindle which is guided in a nut which is positionally fixed in the housing of the lubricating pump and which is in particular a brass nut. It may alternatively advantageously be provided that the gearing a drive pinion with which meshes a first intermediate gearwheel which in turn meshes with a first piston gearwheel which is assigned to the first screw-type piston and with a second intermediate gearwheel which in turn meshes with a second piston gearwheel which is assigned to the second screw-type piston, such that the two screw-type pistons, with screw threads in identical senses, automatically always rotate in opposite directions and preferably at identical speeds, such that alternately one screw-type piston is in pressure operation and the other screw-type piston is in suction operation. The pinion and the piston gearwheels or if appropriate the intermediate gearwheels and the piston gearwheels preferably have a combination of axial lengths such that they are in engagement in every axial end position of the spindles in their associated nuts.

Furthermore, it may preferably be provided that the screw pistons are provided, in their piston end regions, with in particular elastic seals, such as preferably O rings, in order to be sealed off in their respective discharge duct. In a further advantageous embodiment, it may preferably be provided that, for each elastic seal, such as preferably for each O ring, a sleeve which surrounds the elastic seal on the screw-type piston is provided and arranged on the screw-type piston such that the elastic seal, when it is situated outside the respective discharge duct owing to the axial position of the corresponding screw-type piston, is at any rate situated within the corresponding sleeve when the entry of the elastic seal into the respective discharge duct is imminent, and that each sleeve has an inner diameter which is at least substantially identical to the inner diameter of the associated discharge duct.

It is also preferable if, for each screw-type piston, a discharge duct is provided whose outlet is provided with a check valve in order to prevent a return flow of lubricant into the discharge duct when the associated screw-type piston is in suction operation. It is alternatively or additionally preferably provided that, for each screw-type piston, a discharge duct is provided whose inlet orifice is provided, in the direction of the respective suction chamber, or suction chamber common to both screw-type pistons, with a relief groove.

It is furthermore preferable for a motor such as in particular a direct current electric motor to be provided which comprises or is assigned a rotational direction reversal controller which is in particular assigned a sensor arrangement by means of which the attainment of at least two end positions of the total of four end positions of the two screw-type pistons can be or is detected in order, by means of the rotational direction reversal controller of the motor, to correspondingly control the latter to realize a rotational direction reversal when a screw-type piston reaches an end position.

With regard to a method, a method for supplying lubricant is provided as per claim 12, wherein a first screw-type piston is in suction operation while a second screw-type piston is in pressure operation and vice versa, and wherein the two screw-type pistons are driven by means of a common gearing which comprises one piston gearwheel for each screw-type piston.

Taking this as a starting point, it may preferably furthermore be provided that the piston gearwheels mesh with one another and thereby rotate in opposite directions, or that the gearing comprises intermediate gearwheels which are positioned upstream of the piston gearwheels and which are configured such that the piston gearwheels thereby rotate in opposite directions.

A further preferred method variant consists in that the screw-type pistons are provided, in their piston end regions, with in particular elastic seals, such as preferably O rings, in order to be sealed off in their respective discharge duct, and in that the seals, at any rate before the entry thereof into their respective discharge duct, are in each case preloaded within a sleeve which surrounds the corresponding screw-type piston.

It may furthermore preferably be provided that, upon the entry of a screw-type piston into its discharge duct in pressure operation, a release of pressure into the respective suction chamber, or suction chamber which is common to both screw-type pistons, takes place via a relief groove on the edge of the opening-in point of the discharge duct.

Further preferred and/or advantageous embodiments of the invention will emerge from the dependent claims and the combinations thereof and also from the entirety of the present application documents, and in particular the explanations and illustrations of design examples in the description and in the drawing.

DESCRIPTION OF THE DRAWINGS

The invention will be explained in more detail merely by way of an example below on the basis of design examples and with reference to the drawing, in which.

DESCRIPTION OF THE PREFERRED EMBODIMENT

Figure 1:
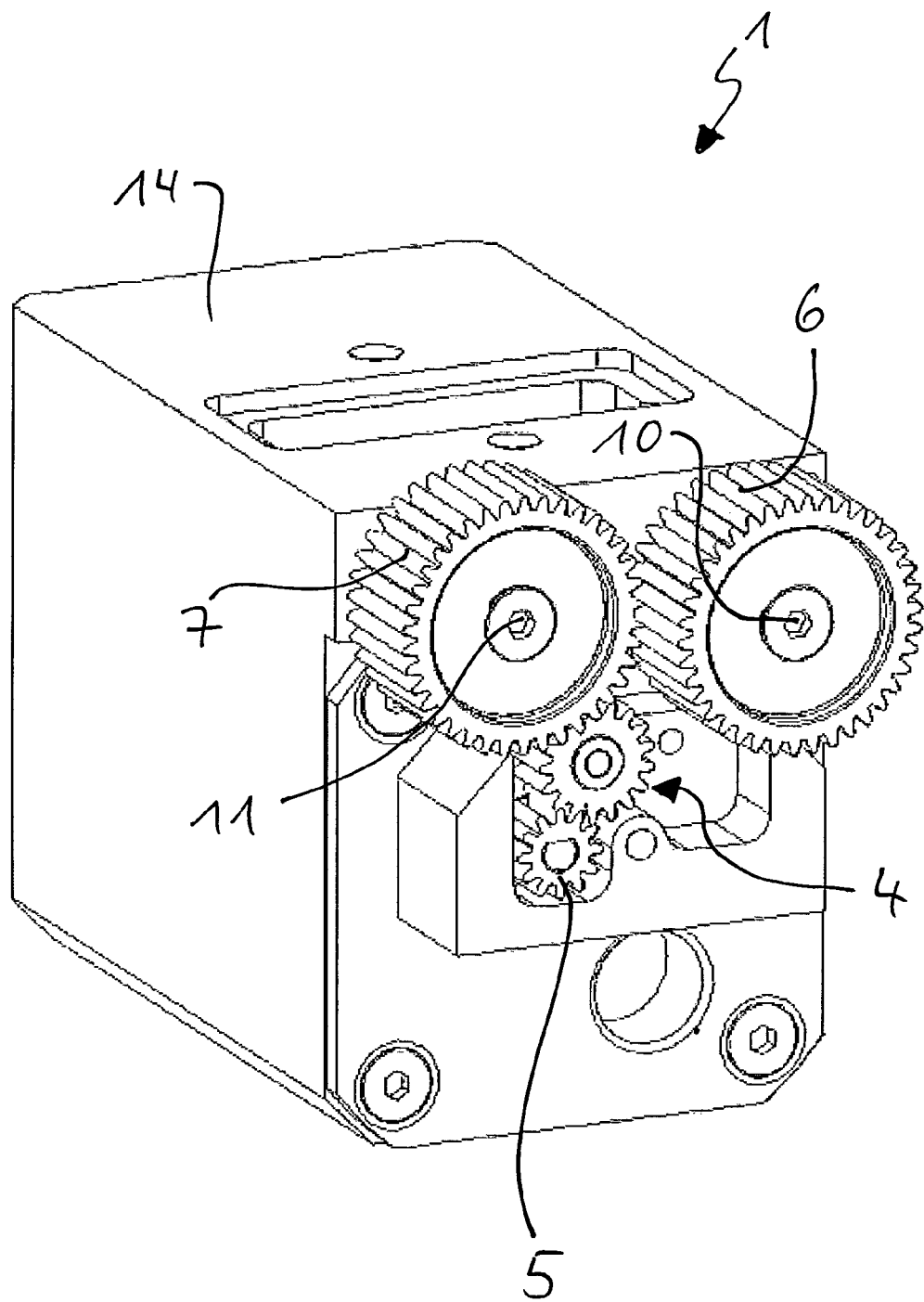
FIG. 1 shows a schematic perspective view of a first design example of a lubricating pump.

On the basis of the design and application examples described below and illustrated in the drawing, the invention will be explained in more detail merely by way of an example, that is to say the invention is not restricted to said design and application examples or to the respective combinations of features within individual design and application examples. Method and device features will in each case emerge analogously from device and method descriptions respectively.

Individual features which are specified and/or illustrated in connection with specific design examples are not restricted to said design examples or to the combination with the other features of said design examples, but rather may be combined, within the scope of that which is technically possible, with any other variants, even if they are not discussed separately in the present documents, and in particular with features and refinements of other design examples.

The same reference numerals are used in the individual figures and images of the drawings to denote identical or similar components or components of identical or similar action. The illustrations of the drawing also clearly show features not denoted by reference numerals, regardless of whether or not such features are described below. Furthermore, features included in the present description but not visible or illustrated in the drawing are also readily understandable to a person skilled in the art.

Device and method features will also emerge in each case from figure illustrations and written descriptions of methods and devices respectively.

Furthermore, the list of reference numerals at the end of this description is explicitly a constituent part of this description.

Figure 2:
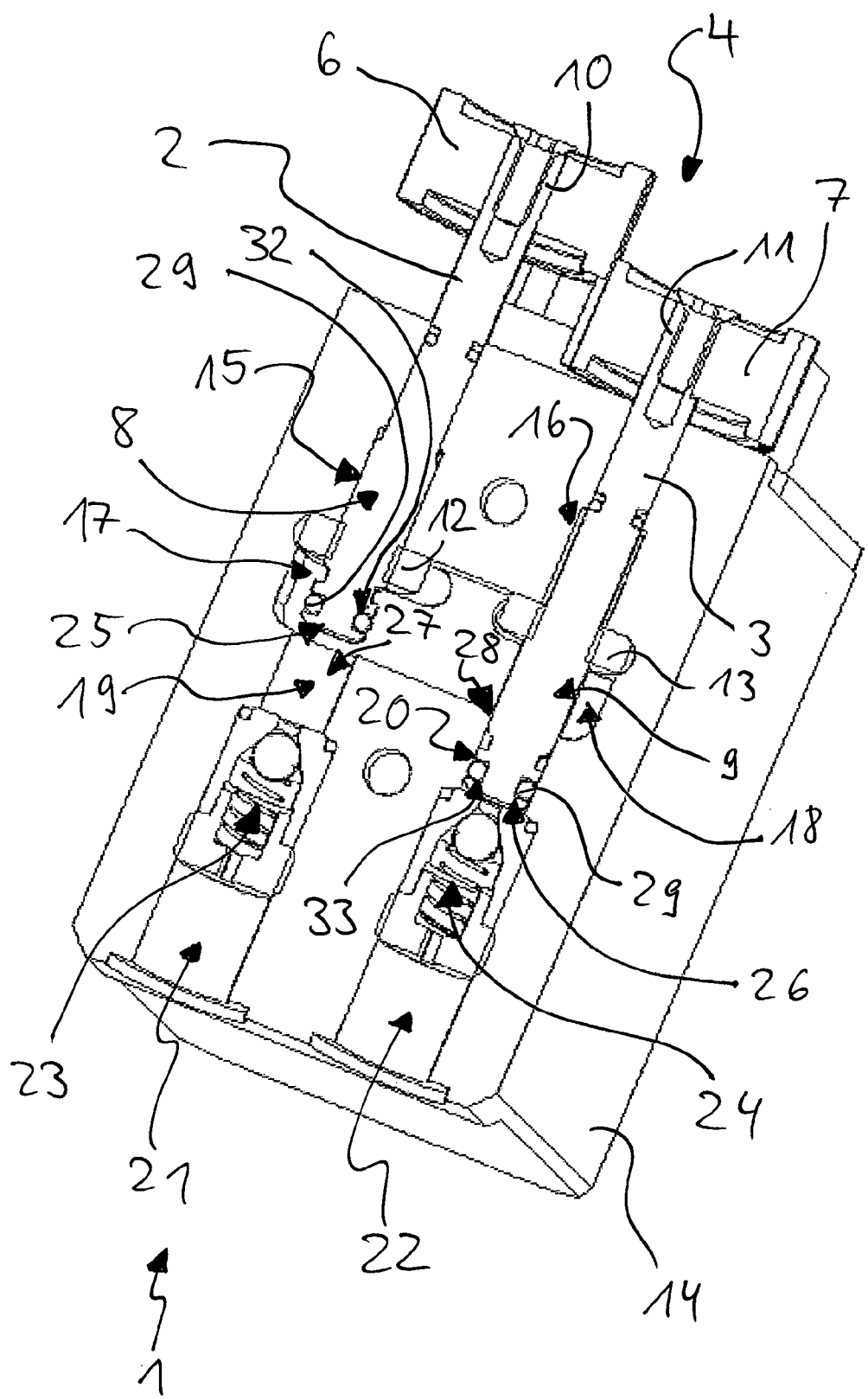
FIG. 2 shows a schematic sectional illustration of the first design example of the lubricating pump from FIG. 1 with the right-hand screw-type piston as viewed in the discharge direction being in the retracted position, and therefore in a discharge-ready state, and with the left-hand screw-type piston as viewed in the discharge direction being arranged in the foremost position, and therefore in a suction-ready state.
Figure 3:
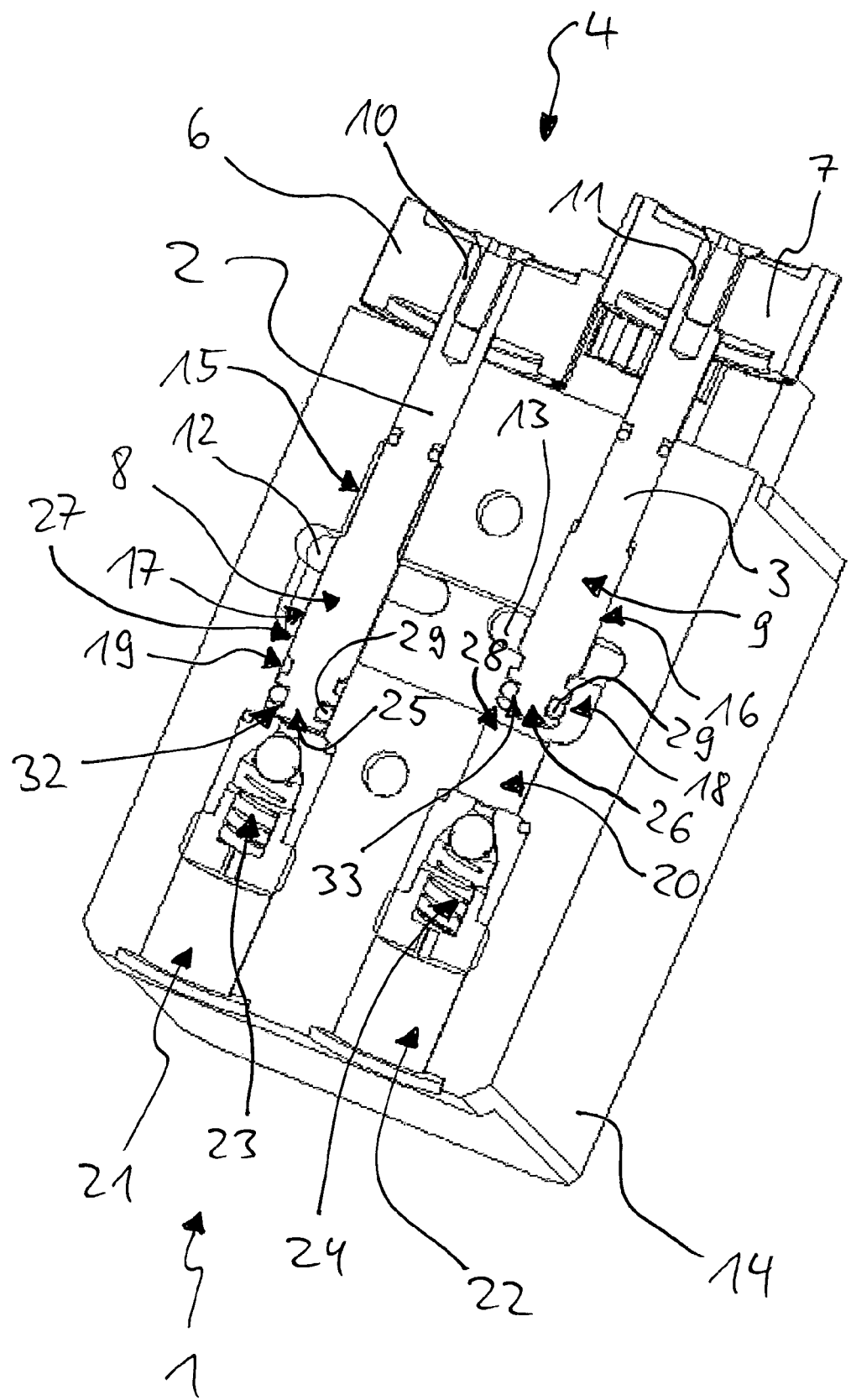
FIG. 3 shows a schematic sectional illustration of the first design example of the lubricating pump from FIGS. 1 and 2 with the right-hand screw-type piston as viewed in the discharge direction being in the foremost position, and therefore in a suction-ready state, and with the left-hand screw-type piston as viewed in the discharge direction being in the retracted position, and therefore in a discharge-ready state, FIGS. 4a, 4b and 4c correspondingly show in each case a plan view, a side view and a partially sectional view of a second design example of a lubricating pump, with the right-hand screw-type piston as viewed in the discharge direction being in the retracted position, and therefore in a discharge-ready state, and with the left-hand screw-type piston as viewed in the discharge direction being arranged in the foremost position, and therefore in a suction-ready state, FIGS. 5a, 5b and 5c correspondingly show in each case a plan view, a side view and a partially sectional view of the second design example of a lubricating pump as per FIGS. 4a, 4b and 4c, with the left-hand screw-type piston as viewed in the discharge direction being in the retracted position, and therefore in a discharge-ready state, and with the right-hand screw-type piston as viewed in the discharge direction being arranged in the foremost position, and therefore in a suction-ready state.

FIG. 1 shows a first design example of a lubricating pump 1 in a schematic perspective view. Figure shows a schematic sectional illustration of the first design example of the lubricating pump 1 from FIG. 1 with the right-hand screw-type piston 2 as viewed in the discharge direction being in the retracted position, and therefore in a discharge-ready state, and with the left-hand screw-type piston 3 as viewed in the discharge direction being arranged in the foremost position, and therefore in a suction-ready state. The schematic sectional illustration of the first design example of the lubricating pump 1 from FIGS. 1 and 2 is shown in FIG. 3 with the right-hand screw-type piston 2 as viewed in the discharge direction being in the foremost position, and therefore in a suction-ready state, and with the left-hand screw-type piston 3 as viewed in the discharge direction being in the retracted position, and therefore in a discharge-ready state. From a comparison of FIGS. 2 and 3, it is readily apparent that the two screw-type pistons 2 and 3 of the lubricating pump 1 are alternately and oppositely in pressure operation and in suction operation.

The basic mode of operation is realized by means of a gearing 4 which serves for simultaneously driving both screw-type pistons 2 and 3, such that alternately one is in pressure operation and the other is in suction operation. For this purpose, in the first design example, the gearing 4 comprises a drive pinion 5 with which meshes a first piston gearwheel 6 which is assigned to the first screw-type piston 2 and which in turn meshes with a second piston gearwheel 7 which is assigned to the second screw-type piston 3, such that the two screw-type pistons 2 and 3, with respective screw threads 8 and 9 in identical senses, automatically always rotate in opposite directions and, with equal thread pitch of the two screw threads 8 and 9, at identical speeds, such that alternately one screw-type piston 2, 3 is in pressure operation and the other screw-type piston is in suction operation. As a result of the design of the screw-type pistons 2 and 3 each with the screw thread 8 and 9 respectively, it can also be said that the screw-type pistons 2, 3 comprise in each case one screw spindle, which screw spindles can therefore also be regarded as being synonymous with the reference signs 8 and 9 of the screw threads.

To convert the rotational movement of the screw-type pistons 2 and 3, effected by the drive of the corresponding piston gearwheel 6, 7 in each case fastened coaxially to the free end 10 and 11 of the screw-type pistons 2 and 3 respectively, into an axial movement of the screw-type pistons 2 and 3, the screw thread 8 and 9 is screwed in each case into a nut 12 and 13 respectively. The two nuts 12 and 13 are accommodated in a positionally fixed manner adjacent to one another in a housing 14 of the lubricating pump 1, and in the present, first design example, are composed of brass.

Situated parallel to one another in the housing 14 are receiving chambers 15 and 16 for the two screw-type pistons 2 and 3, which receiving chambers also contain, as is understandable, the two nuts 12 and 13. The receiving chambers 15 and 16 end at one side in passage orifices (not indicated) in the housing 14, wherein the free ends 10 and 11, which bear the piston gearwheels 6, 7, of the screw-type pistons 2 and 3 respectively emerge from the housing 14 or are at least accessible from outside the housing 14 such that the piston gearwheels 6 and 7 can be fastened in a rotationally conjoint and also axially fixed manner to the free ends 10 and 11 of the screw-type pistons 2 and 3. The piston gearwheel 7 of the left-hand screw-type piston 3 as viewed in the discharge direction for lubricant (not illustrated) from the lubricating pump 1 meshes with the drive pinion 5 of the gearing 4. The two piston gearwheels 6 and 7 have in each case an axial dimension such that they remain in engagement with one another over the entire axial adjustment travel of the screw-type pistons 2 and 3, and such that the piston gearwheel 7 of the left-hand screw-type piston 3 as viewed in the discharge direction for lubricant (not illustrated) from the lubricating pump 1 remains in engagement, over the entire axial adjustment travel thereof, with the drive pinion 5.

Figure 7:
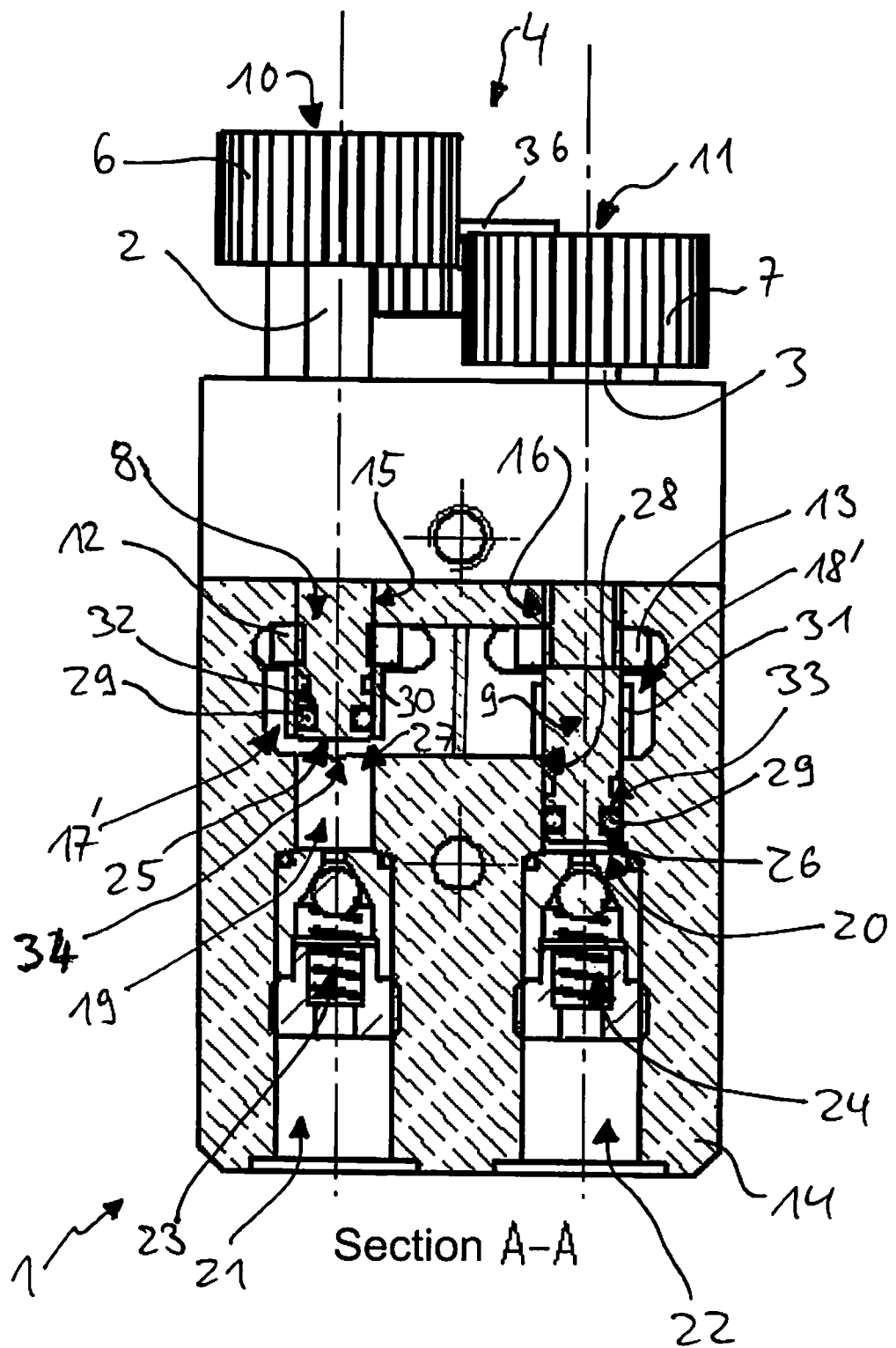
FIG. 7 shows a partially sectional view of an alternate construction of the lubricating pump of FIG. 4c.

Opposite the free ends 10 and 11 of the screw-type pistons 2 and 3 respectively, the receiving chambers 15 and 16 open into suction chambers 17 and 18 respectively which, as shown in the embodiment of FIGS. 1, 2, 3, 4a, 4b, 4c, 5a, 5b, and 5c, are integral divisions of chamber 38 into which, as is readily understandable, lubricant (not illustrated) passes through supply units (not visible) into the receiving chambers 15 and 16 when the respective screw-type piston 2 or 3 is in suction operation. Opposite the opening-in points at which the receiving chambers 15 and 16 open into the suction chambers 17 and 18 respectively, discharge ducts 19 and 20 respectively open into said suction chambers 17 and 18, into which discharge ducts lubricant (not illustrated) is pushed by the screw-type piston 2 or 3 which is respectively in pressure operation. Situated in the housing between the discharge ducts 19 and 20 and lubricant outlets 21 and 22 is in each case one check valve 23 and 24 respectively, said check valves preventing lubricant (not illustrated) from being sucked back out of the lubricant outlet 21 and 22 in the housing 4 when the corresponding screw-type piston 2 or 3 is in suction operation. Separate lubricant supply lines (not illustrated) to separate lubricating points (not illustrated) may be connected to the lubricant outlets 21 and 22, or both lubricant outlets 21 and 22 may be combined via a T-shaped line piece (not illustrated), such as is generally known, in order to jointly supply one lubricating point (not illustrated) via one lubricant supply line (not illustrated) which is connected to the single outlet of the T-shaped line piece (not illustrated). Instead of a common suction chamber 38 containing integral chambers 17 and 18, separate suction chambers 17' and 18' may be used for both screw-type pistons 2, 3 by partitioning suction chamber 38 as shown in FIG. 7, without making any other changes to the pump.

The dimensions of the suction chambers 17 and 18 in particular in the axial direction of the screw-type pistons 2 and 3 respectively are coordinated with the axial movement of said screw-type pistons, and with the end positions of said screw-type pistons in which they are deployed to a maximum extent out of the housing 4, such that the working ends 25 and 26, which are situated opposite the respective free ends 10 and 11 of the screw-type pistons 2 and 3 which have the piston gearwheels 6 and 7, completely open up the opening-in points 27 and 28, at which the discharge ducts 19 and 20 respectively open into the suction chambers 17 and 18, when the respective screw-type piston 2 or 3 is in its fully retracted position, that is to say its position in which it is deployed out of the housing 4 to a maximum extent. In this way, the lubricating pump 1 is provided with significantly better suction characteristics than other designs. To further increase the efficiency of the screw-type pistons 2, 3 during the forcing of lubricant (not illustrated) out of the suction chambers 17 and 18 and into the discharge ducts 19 and 20 and onward via the check valves 23 and 24 into the lubricant outlets 21 and 22 in the housing 4, the working ends 25 and 26 are provided with elastic seals 29, such as preferably O rings, in order to be sealed off in their respective discharge duct 19 and 20.

For the drive of the lubricating pump 1, the latter comprises a motor (not visible), such as in particular a direct current electric motor, which is jointly accommodated in the housing 4. To permit the rotational direction reversal of the two screw-type pistons 2 and 3 in a simple manner, a corresponding controller (not visible) is furthermore provided and advantageously also accommodated in the housing 4. The rotational direction reversal controller may for example be designed so as to reverse the direction of rotation after a predefined number of revolutions of the motor shaft, or such that at least two end positions of the two screw-type pistons 2 and 3 are sensed by means of a second arrangement, by means of which the attainment of at least two end positions of the total of four end positions of the two screw-type pistons 2 and 3 can be or is detected in order, by means of the rotational direction reversal controller of the motor, to correspondingly control the latter to realize a rotational direction reversal when a screw-type piston 2, 3 reaches an end position. The sensor arrangement may for example comprise two simple switches, such as may be readily understood and implemented by any person skilled in the art with instruction in this regard.

With regard to a method, in the method for supplying lubricant, the first screw-type piston 2 is in suction operation while the second screw-type piston 3 is in pressure operation and vice versa, and the two screw-type pistons 2 and 3 are driven by means of the common gearing 4 which, for each screw-type piston 2, 3, comprises the piston gearwheel 6 and 7 correspondingly assigned thereto and fixed thereto in terms of rotation and axially, said piston gearwheels 6, 7 meshing with one another and thereby rotating in opposite directions.

Figure 4B:
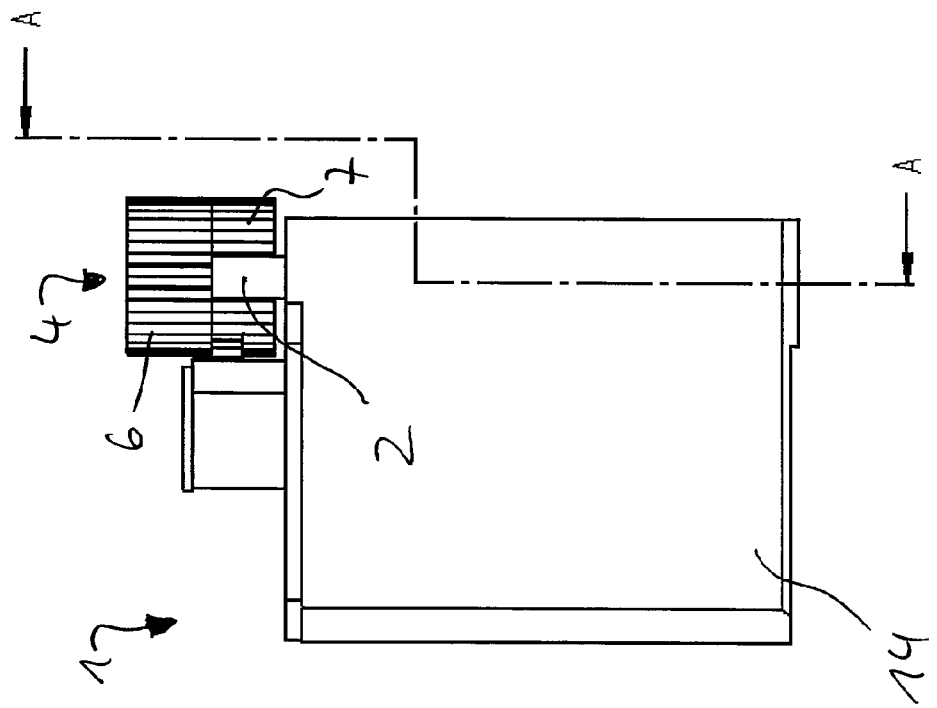
Figure 4A:
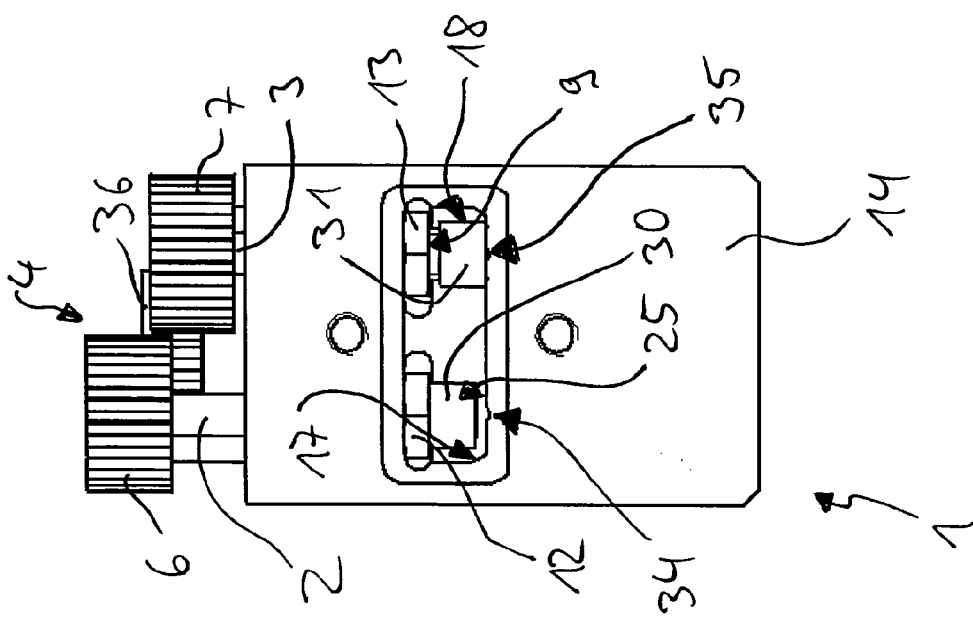
Figure 4C:
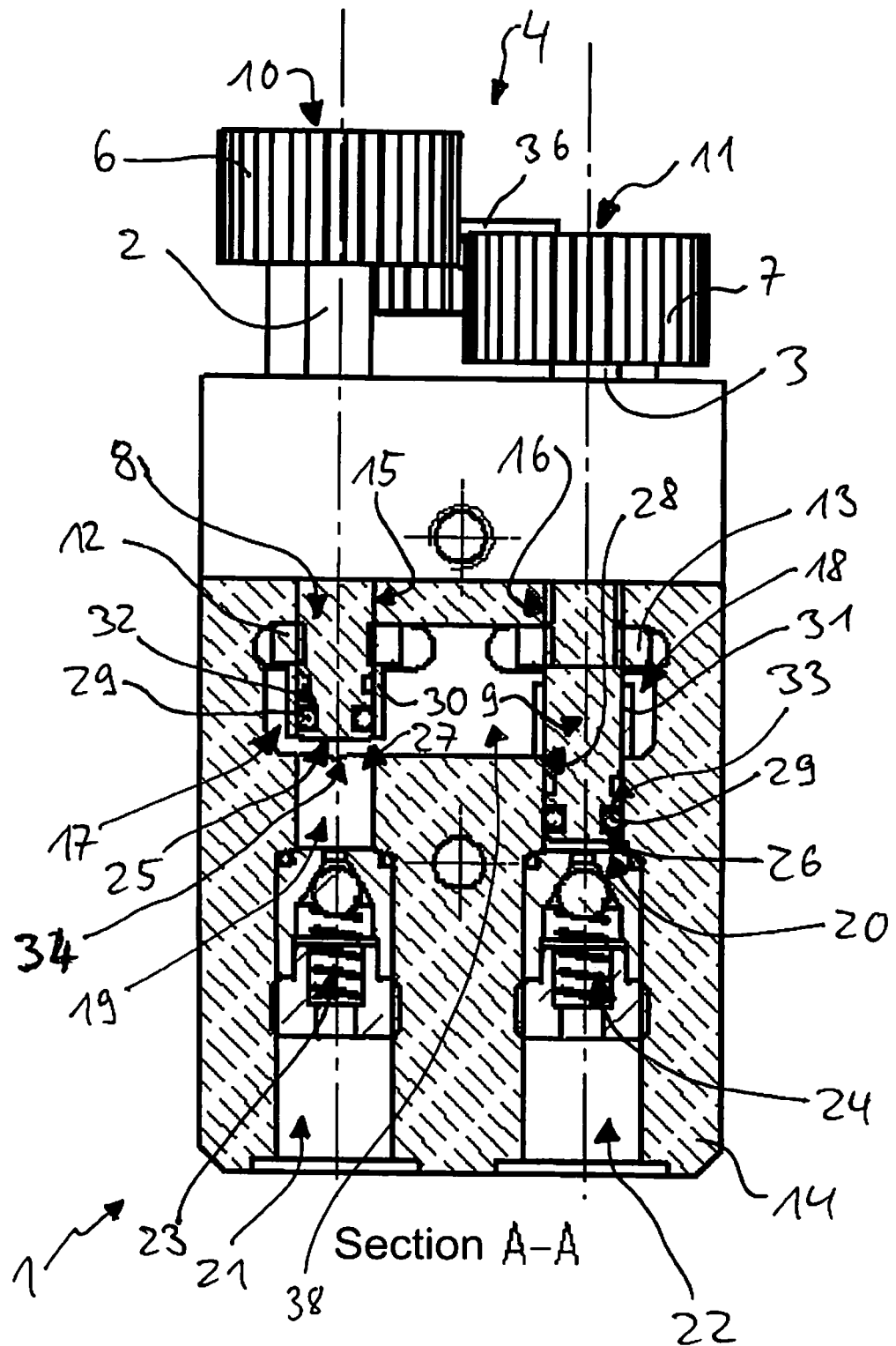
Figure 5C:
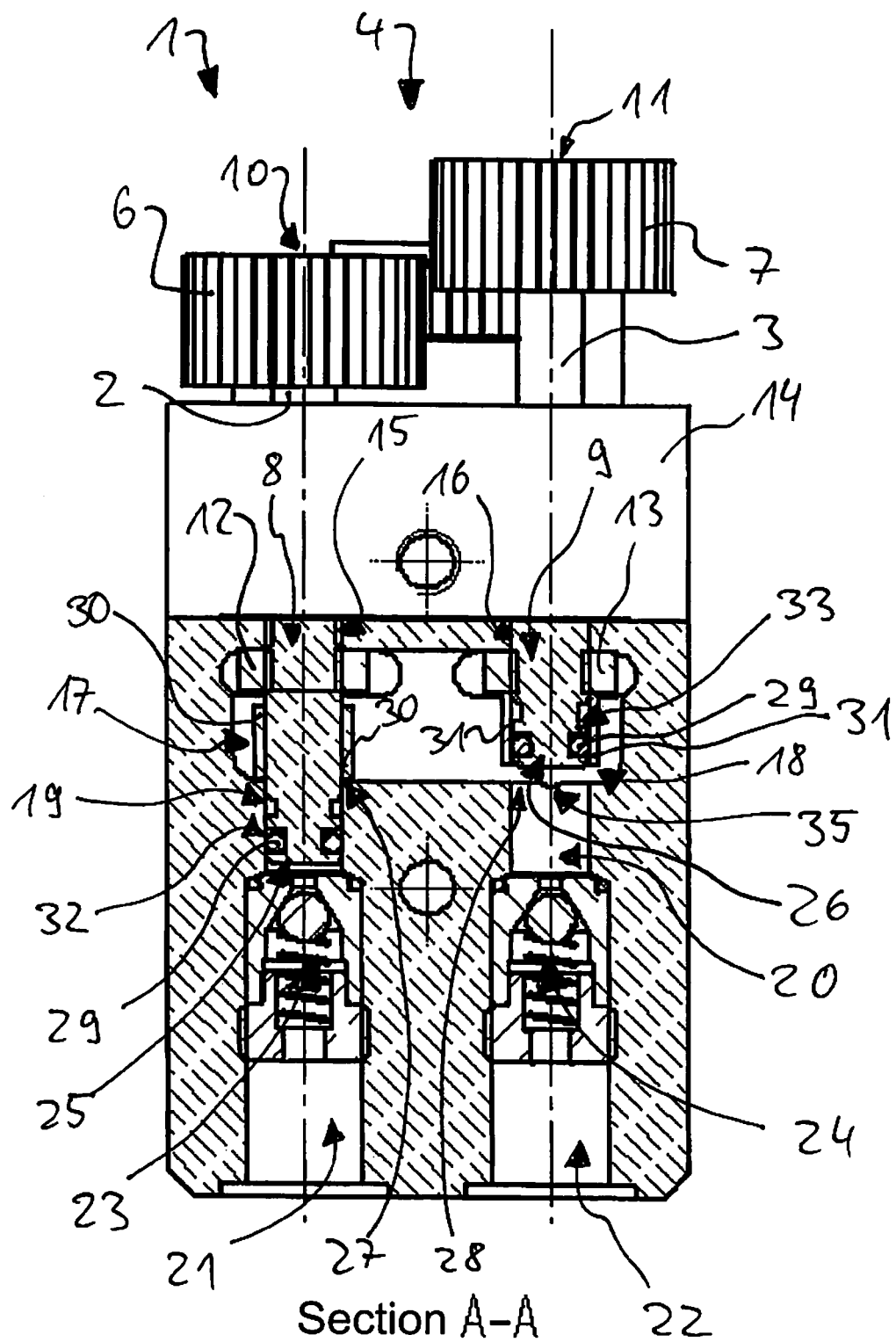
Figure 6:
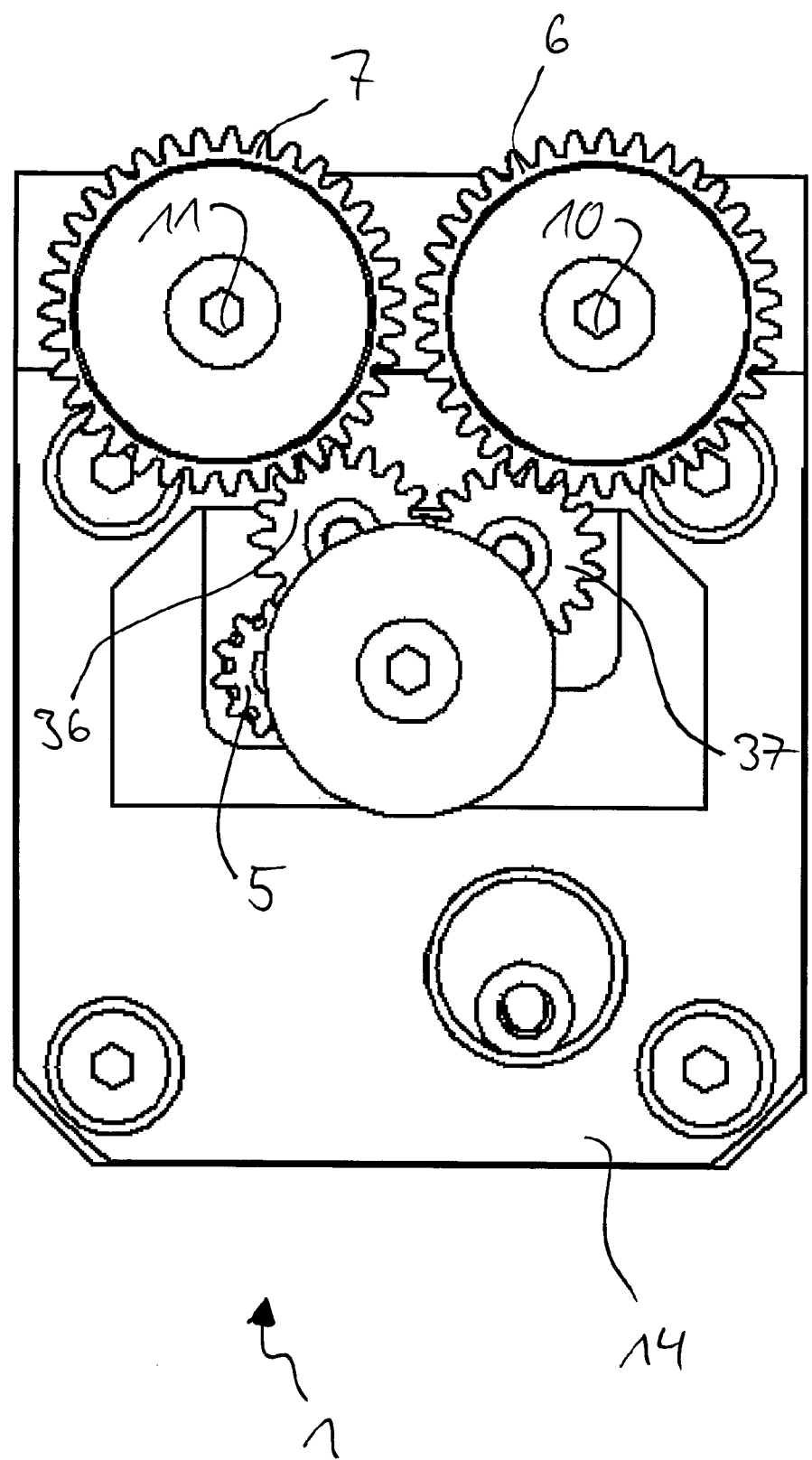
FIG. 6 shows a schematic front view of the second design example of the lubricating pump as per FIGS. 4a, 4b, 4c, 5a, 5b and 5c.

A second design example of a lubricating pump 1 is shown in various views and operating states in FIGS. 4a, 4b, 4c, 5a, 5b, 5c and 6. FIGS. 4a, 4b and 4c correspondingly in each case schematically show a plan view, a side view and a partially sectional view of the second design example of the lubricating pump 1, with the right-hand screw-type piston 2 as viewed in the discharge direction being in the retracted position, and therefore in a discharge-ready state, and with the left-hand screw-type piston 3 as viewed in the discharge direction being arranged in the foremost position, and therefore in a suction-ready state. FIGS. 5a, 5b and 5c correspondingly in each case schematically show a plan view, a side view and a partially sectional view of the second design example of the lubricating pump 1, with the left-hand screw-type piston 3 as viewed in the discharge direction being in the retracted position, and therefore in a discharge-ready state, and with the right-hand screw-type piston 2 as viewed in the discharge direction being arranged in the foremost position, and therefore in a suction-ready state. FIG. 6 shows the second design example of the lubricating pump 1 with further details in a schematic front view. Where the design, the features and the operation of the second design example of the lubricating pump 1 are identical to or directly correspond in each case to the design, the features and the operation of the first design example of the lubricating pump 1 as per FIGS. 1, 2 and 3, this is indicated by identical reference signs, and a separate explanation and description of said design and features and of the operation has been omitted, in that in this regard, reference is made entirely to the statements made with regard to the first design example.

Over and above the first design example as per FIGS. 1, 2 and 3, the lubricating pump 1 of the second design example as per FIGS. 4a, 4b, 4c, 5a, 5b, 5c and 6 comprises a sleeve 30 for the right-hand screw-type piston 2 as viewed in the discharge direction, and a sleeve 31 for the left-hand screw-type piston 3 as viewed in the discharge direction. The sleeves 30, 31 are slightly shorter than the dimension of the suction chambers 17, 18 in the longitudinal direction of the screw-type pistons 2, 3 minus the thickness of the nuts 12, 13 in this direction, or in other words, the sleeves 30, 31 are slightly shorter than the spacing between the opening-in points or inlet orifices 27, 28 of the discharge ducts 19, 20 for the screw-type pistons 2, 3 and the nuts 12, 13. The inner diameter of the sleeves 30, 31 is at least substantially identical to the inner diameter of the discharge ducts 19, 20 into which the screw-type pistons 2, 3 are screwed in a rotating manner in each case during pressure operation in order to discharge lubricant from the suction chambers 17, 18. The sleeves 30, 31 surround the respective screw-type piston 2, 3 and serve to preload the elastic seals 29, which are formed in particular by O rings, in the region of the working ends 25, 26 of the screw-type pistons 2, 3, such that during pressure operation or lubricant discharge operation of each screw-type pistons 2, 3, said elastic seals 29 correspondingly enter in said "preloaded" state into the inlet orifices or inlets 27, 28 of the discharge ducts 19, 20 for the screw-type pistons 2, 3. In this way, the elastic seals 29, such as in particular O rings, are protected against shearing when they enter the inlet orifices or opening-in points 27, 28 of the discharge ducts 19, 20 for the screw-type pistons 2, 3. To receive and positionally fix the elastic seals 29, such as in particular O rings, on the screw-type pistons 2, 3, the latter comprise in each case one annular receiving groove 32, 33 which is of a design suited for example to O rings.

During operation, during suction operation or during the movement of the respective screw-type piston 2, 3 in the suction direction, the sleeve 30, 31 is moved jointly with said screw-type piston 2, 3 when the corresponding elastic seal 29 emerges from the associated discharge duct 19, 20. Depending on the axial length of the sleeve 30, 31, the latter then comes into contact with the respective nut 12, 13 before the corresponding screw-type piston 2, 3 comes to the end of its movement in the suction direction and reaches its movement or movement direction reversal point for the subsequent movement in the pressure direction, that is to say for the pressure operation. When the sleeve 30, 31 bears against the respective nut 12, 13 and is thereby blocked or stopped in the axial direction, and the corresponding screw-type piston 2, 3 moves onward in the suction direction, the associated elastic seal 29, such as in particular the corresponding O ring, is positively pulled further into the sleeve 30, 31, as can be seen in FIG. 4c in the case of the left-hand screw-type piston 2 and in FIG. 5c in the case of the right-hand screw-type piston 3.

After the movement direction reversal of the screw-type piston 2, 3, that is to say during a movement in the pressure or discharge direction and therefore in pressure operation, the respective sleeve 30, 31 continues to be held fixed in its axial position on the corresponding screw-type piston 2, 3 by the clamping of the elastic seal 29, such as in particular the corresponding O ring, and moves jointly with said screw-type piston 2, 3 in the pressure direction until the sleeve 30, 31 abuts against or comes into contact with the inlet opening or opening-in point 27, 28 of the respective discharge duct 19, 20 for the screw-type piston 2, 3. The corresponding screw-type piston 2, 3 then moves onward in the axial direction in pressure operation without the sleeve 30, 31 being driven any further, and in the process the elastic seal 29, that is to say in the present second design example the corresponding O ring, is pushed out of its sleeve 30, 31 through the respective opening-in point or inlet orifice 27, 28 into the corresponding discharge duct 19, 20. Since the elastic seal 29 or the O ring is preloaded in the sleeve 30, 31, no shearing of the elastic seal 29 or of the respective O ring can occur as the latter passes through the respective inlet orifice or opening-in point 27, 28.

The sleeves 30, 31 are particularly advantageously at pressures >20 bar, thus reliably preventing shearing of the elastic seal 29 or of the respective O ring. Wear-induced outlay for operating the lubricating pump 1 is therefore minimized in a particularly advantageous manner by means of the sleeves 30, 31.

As a further difference of the second design example as per FIGS. 4a, 4b, 4c, 5a, 5b, 5c and 6 in relation to the first design example as per FIGS. 1, 2 and 3, the discharge ducts 19, 20 for the screw-type pistons 2, 3 comprise, at their inlet orifices or inlets 27, 28, in each case one relief groove 34, 35, as can be seen in FIG. 4c at the inlet 27 of the discharge duct 19 and in FIG. 5c at the inlet 28 of the discharge duct 20. It has been found in tests that a very small groove at the inlet has a positive effect during the screwing of the screw-type piston into the discharge duct in pressure operation or in the pressure direction. The pressure does not build up in an abrupt manner when the O ring, or more generally the elastic seal, is still fully outside, that is to say in the suction chamber or in the respective suction chamber, but rather the pressure can initially escape via said small relief groove. In this way, only a very small part of the O ring, or more generally of the elastic seal, need be screwed in in a rotating manner under full pressure. The relief grooves 34, 35 thus likewise advantageously contribute to permanent operation of the lubricating pump 1 with the least possible outlay.

As can also be seen from a comparison of FIGS. 1 and 6, in the second design example as per FIGS. 4a, 4b, 4c, 5a, 5b, 5c and 6, in contrast to the first design example as per FIGS. 1, 2 and 3, two intermediate gearwheels 36, 37 are interposed between the drive pinion 5 and the piston gearwheels 6, 7, and the two piston gearwheels 6, 7 are not in direct engagement with one another. In the second design example, the first intermediate gearwheel 36 meshes with one piston gearwheel 7 and with the second intermediate gearwheel 37, the latter being in engagement with the other piston gearwheel 6, such that the two piston gearwheels 6, 7 rotate in opposite directions. In this way, a further advantage of the lubricating pump 1 according to the second design example over the first design example is that improved efficiency is attained by virtue of increased accuracy being attained through the use of the two intermediate gearwheels 36, 37. The lubricating pump 1 according to the first design example comprises two overhung mountings of the rotating screw-type pistons 2, 3, said mountings on the one hand being subjected to direct loading at the drive side (engagement of drive pinion 5 with piston gearwheel 7 and screw-type piston 3) and at the same time being subjected to loading at the drive output side (engagement of piston gearwheel 7 with screw-type piston 3 and piston gearwheel 6 with screw-type piston 2), and on the other hand being subjected to loading only at the drive input side (engagement of piston gearwheel 6 with screw-type piston 2 and piston gearwheel 7 with screw-type piston 3). As a result of the arrangement and construction in the second design example, doubled accuracy in relation to the design of the first design example is attained because the intermediate gears 36, 37 run exactly and the loadings of the piston gearwheels 6, 7 are equal.

The invention has been illustrated on the basis of the design examples in the description and in the drawing merely by way of an example, and is not restricted to these but rather comprises all variations, modifications, substitutions and combinations which a person skilled in the art will gather from the present documents, in particular from the scope of the claims and from the general explanations in the introductory part of this description and from the description of the design examples and the illustrations thereof in the drawing, and combine with his expert knowledge and with the prior art, in particular with the content of disclosure of the own prior publications cited in the introduction. In particular, all the individual features and design options of the invention and of its design variants are combinable.

DESIGNATIONS

1 Lubricating pump
2, 3 Screw-type piston
4 Gearing
5 Drive gearwheel
6, 7 Piston gearwheel
8, 9 Screw spindle, screw thread
10, 11 Free end
12, 13 Nut
14 Housing
15, 16 Receiving chamber
17, 18 Suction chamber
19, 20 Discharge duct
21, 22 Lubricant outlet
23, 24 Check valve
25, 26 Working ends
27, 28 Opening-in point, inlet orifice, inlet
29 Elastic seals
30, 31 Sleeve
32, 33 Receiving groove
34, 35 Relief groove
36, 37 Intermediate gearwheel

The invention claimed is:

1. A lubricating pump comprising:
a housing having a suction chamber, a first receiving chamber opening into said suction chamber, and a second receiving chamber opening into said suction chamber,
a first screw-type piston disposed in said first receiving chamber for performing a suction operation in order to admit lubricant into said suction chamber and for performing a pressure operation in order to expel lubricant from said suction chamber,
a second screw type piston disposed in said second receiving chamber for performing a suction operation in order to admit lubricant into said suction chamber and for performing a pressure operation in order to expel lubricant from said suction chamber, and
a drive operatively connected to said first screw type piston and said second screw type piston for simultaneously moving said first piston to perform said suction operation and moving said second piston to perform said pressure operation, and for alternately simultaneously moving said second piston to perform said suction operation and moving said first piston to perform said pressure operation,
wherein, for each screw-type piston, a discharge duct is provided whose inlet orifice is provided, in the direction of the respective suction chamber with a relief groove.

2. The lubricating pump as claimed in claim 1, wherein each screw-type piston comprises a screw spindle which is guided in a nut which is positionally fixed in the housing of the lubricating pump.

3. The lubricating pump as claimed in claim 1 or 2, comprising gearing for driving both screw-type pistons simultaneously such that alternately one is in pressure operation and the other is in suction operation.

4. The lubricating pump as claimed in claim 2, wherein gearing comprising a drive pinion which meshes with a first piston gearwheel which is assigned to the first screw-type piston and which in turn meshes with a second piston gearwheel which is assigned to the second screw-type piston, such that the two screw-type pistons, with screw threads in identical senses, automatically always rotate in opposite directions, such that alternately one screw-type piston is in pressure operation and the other screw-type piston is in suction operation.

5. The lubricating pump as claimed in claim 2, wherein gearing comprising a drive pinion with which meshes a first intermediate gearwheel which in turn meshes with a first piston gearwheel which is assigned to the first screw-type piston and with a second intermediate gearwheel which in turn meshes with a second piston gearwheel which is assigned to the second screw-type piston, such that the two screw-type pistons, with screw threads in identical senses, automatically always rotate in opposite directions, such that alternately one screw-type piston is in pressure operation and the other screw-type piston is in suction operation.

6. The lubricating pump as claimed in claim 4 or 5, wherein the drive pinion, and the first piston gearwheel and second piston gearwheel, have a combination of axial lengths such that they are in engagement in every axial end position of the screw-type spindles in their associated nuts.

7. The lubricating pump as claimed in claim 1, wherein the screw-type pistons are provided, in their piston end regions, with elastic seals in order to be sealed off in their respective discharge ducts.

8. The lubricating pump as claimed in claim 7, wherein for each elastic seal, a sleeve which surrounds the elastic seal on the screw-type piston is provided and arranged on the screw-type piston such that the elastic seal, when it is situated outside the respective discharge duct owing to the axial position of the corresponding screw-type piston, is at any rate situated within the corresponding sleeve when the entry of the elastic seal into the respective discharge duct is imminent, and in that each sleeve has an inner diameter which is at least substantially identical to the inner diameter of the associated discharge duct.

9. The lubricating pump as claimed in claim 1, wherein, for each screw-type piston, a discharge duct is provided whose lubricant outlet is provided with a check valve in order to prevent a return flow of lubricant into the discharge duct when the associated screw-type piston is in suction operation.

10. The lubricating pump as claimed in claim 1, comprising a motor which comprises or is assigned a rotational direction reversal controller.

11. The lubricating pump claimed in claim 1, wherein said suction chamber is partitioned into a first suction chamber and a second suction chamber separate from said first suction chamber.

12. The lubricating pump as claimed in claim 4 or 5, wherein the two screw-type pistons rotate at identical speeds.

13. The lubricating pump as claimed in claim 7 or 8, wherein each of said elastic seals comprises an O-ring.

14. The lubricating pump as claimed in claim 10, wherein said motor is a direct-current electric motor.

* * * * *